United States Patent

[11] 3,633,733

[72] Inventor Henry W. Rehr
 Concord, Calif.
[21] Appl. No. 8,939
[22] Filed Feb. 5, 1970
[45] Patented Jan. 11, 1972
[73] Assignee Crown Zellerbach Corporation
 San Francisco, Calif.

[54] ARTICLE-HANDLING APPARATUS
 12 Claims, 13 Drawing Figs.
[52] U.S. Cl.................................................. 198/45,
 198/27
[51] Int. Cl........................................................ B65g 47/00
[50] Field of Search............................................ 198/45, 42,
 46, 47, 50, 51, 79, 80, 34, 188, 40

[56] References Cited
 UNITED STATES PATENTS
1,359,696  11/1920  Greene.......................... 198/79
2,493,464  1/1950   Nelson.......................... 198/40
2,969,883  1/1961   Cargill........................... 198/45
1,839,375  1/1932   Covey............................ 198/24
3,446,371  5/1969   Nicolas.......................... 198/188
2,718,959  9/1959   Van Otteren................... 198/42

Primary Examiner—Richard E. Aegerter
Attorney—Kolisch & Hartwell

ABSTRACT: Article-handling apparatus for the sorting and dispensing of articles. The apparatus includes multiple holding conveyors, stacked one over another, for the temporary, tiered storage of articles passing through the apparatus. Articles travel into the apparatus on a supply conveyor, and are directed to selected ones of multiple, upright gravity operated feed chutes through operation of a remotely controlled diverter. The feed chutes deposit the articles on transfer conveyors disposed at different elevations in the apparatus, and the transfer conveyors then carry the articles to different ones of the stacked holding conveyors. An article-assembling means associated with each transfer conveyor may be actuated to remove a row of articles on a transfer conveyor and deposit such on a holding conveyor. The transfer conveyors also are used in the unloading of holding conveyors, and have off-bearing extremities arranged to deposit articles discharged therefrom into the feed ends of multiple, upright, gravity operated delivery chutes. The delivery chutes deposit articles on a common receiving conveyor. When handling articles of different types, and with these articles sorted by operation of the diverter, a classified storage of articles is produced on the holding conveyors. By controlling the discharge of articles from the delivery chutes, a series of articles may be collected on the receiving conveyor with such being a predetermined assortment of the different types of articles being handled.

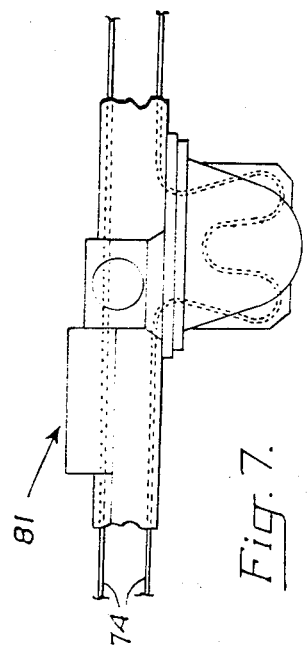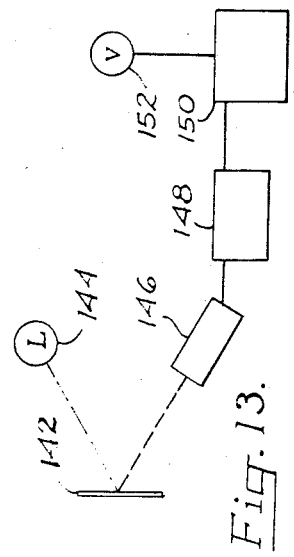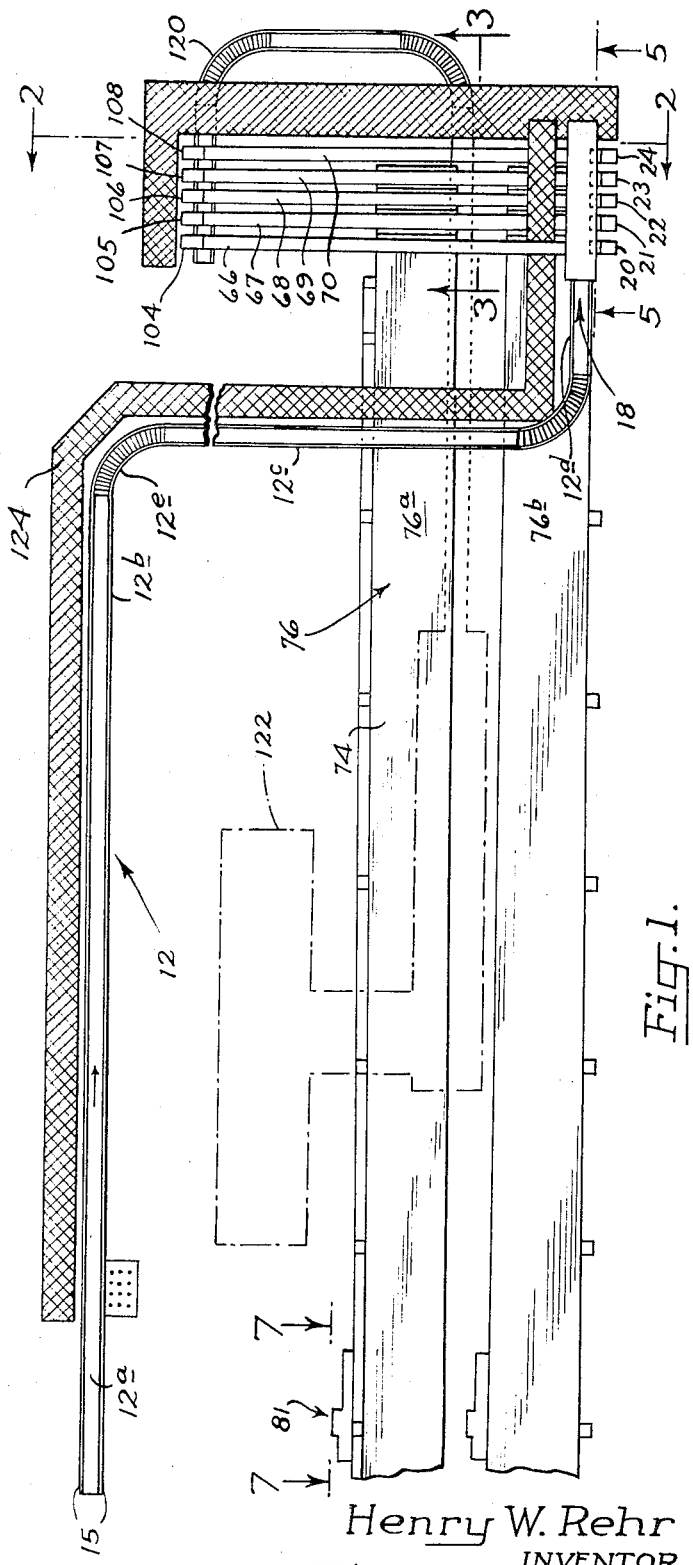

Henry W. Rehr
INVENTOR
BY Kolisch & Hartwell
Attys.

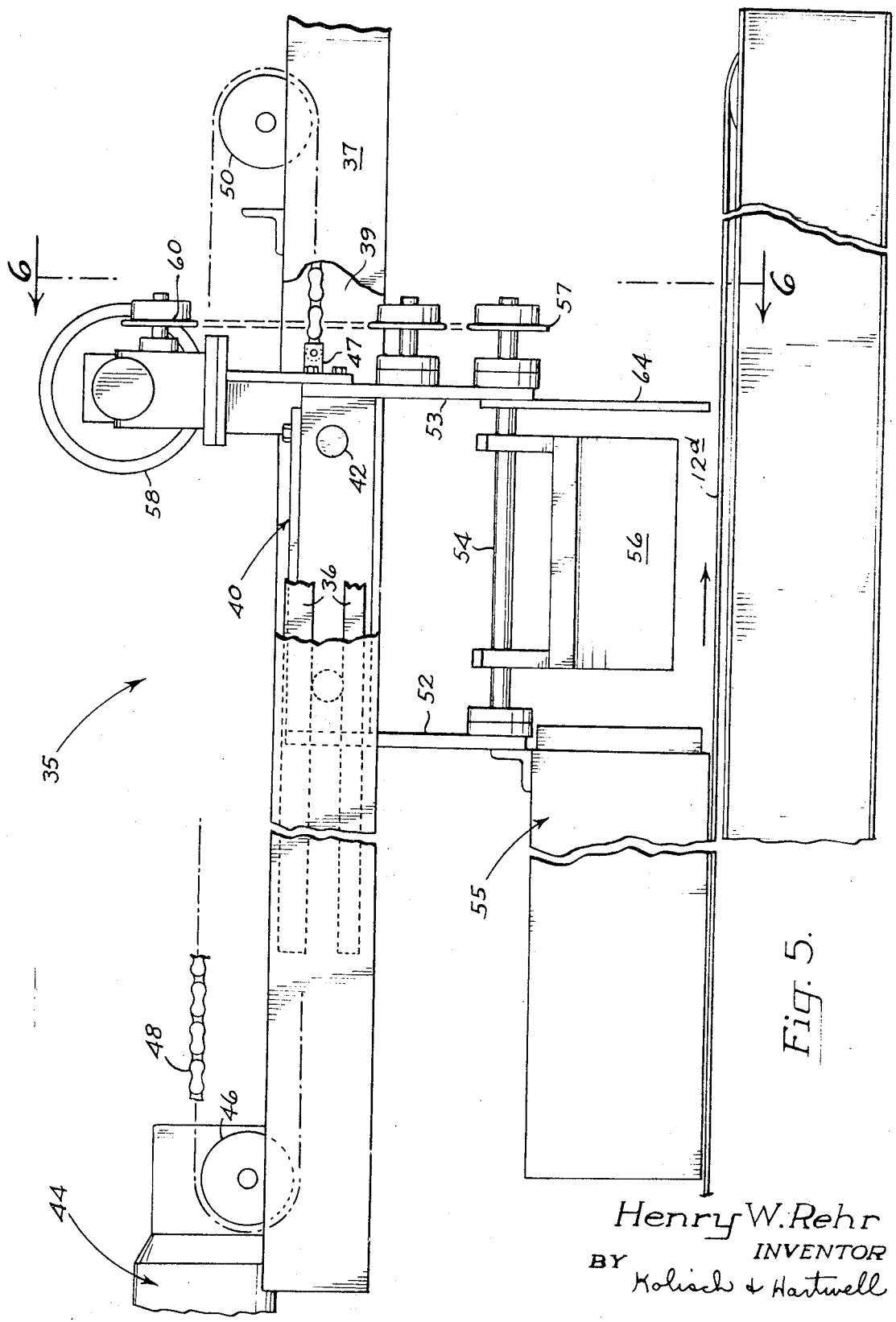

Henry W. Rehr
INVENTOR
BY Kolisch & Hartwell
Attys.

ARTICLE-HANDLING APPARATUS

BACKGROUND OF THE INVENTION

This invention relates generally to article-handling apparatus usable to assembly articles of different types or classes to produce a predetermined assortment.

The specific and preferred embodiment of the invention described herein concerns apparatus adapted for the handling of paper towel rolls, where it is desired to produce a colored assortment for packaging in a container such as a carton. While the apparatus is described in connection with the handling of paper towel rolls, it is appreciated that features of the invention are applicable to the handling of other types of articles, and it is not intended, therefore, by the description to be limited in all instances to the handling of towel rolls.

It is currently a practice in the selling of paper towels to provide a variety of colors and/or patterns, with the purchaser permitted a choice in the particular type of towel that he buys. A carton of towels may hold, for example, 30 towel rolls. If the towels in the carton are all alike, this means that a store manager, if he is to provide his customers with a selection of colors or patterns, is faced with considerable inventory and storage problems. To take care of the difficulty, it is the practice now of a towel manufacturer to provide cartons containing an assortment of styles.

In a paper-manufacturing plant, a production run producing one type of paper towel will involve the production of a vast number of paper towel rolls. The packaging of paper towel rolls in a carton may involve from time to time the changing of the assortment prepared in the carton. For efficiency's sake, the packaging of towel assortments in cartons should be capable of being carried out on a substantially continuous basis, without being effected by interruptions in the supply of towel rolls of any given type. These considerations, and others, have introduced a problem in the design of apparatus which can handle paper towel rolls as such are produced in a paper-manufacturing plant, and produce from different types or classes of paper towel rolls assortments for packing in a carton.

SUMMARY OF THE INVENTION

Generally, an object of this invention is to provide novel article-handling apparatus, capable of producing predetermined assortments of articles, which takes care of the above-indicated difficulties and problems in a highly practical and satisfactory manner.

Another object of the invention is to provide article-handling apparatus which features multiple, upright, gravity operated chutes for holding different classes of articles, where such chutes are constructed to deposit articles on a receiving conveyor, and the number of articles discharged from a particular chute and the particular chute from which the articles are discharged, are controlled to produce the desired assortment of articles on the receiving conveyor.

Another object is to provide such apparatus which further includes a storage facility for each chute, promoting flexibility and continuity in the manner in which an assortment is produced.

Yet another object is to provide article-handling apparatus featuring multiple holding conveyors for the classified storage of articles, and novel means for assembling articles on such holding conveyors and for removing articles from the conveyors, to take care of an influx of articles into the apparatus and for the withdrawal of articles, respectively.

A related object is to provide such apparatus where a holding conveyor comprises a belt conveyor having an upper run defining an article-supporting surface, and articles are both deposited on the conveyor and removed from the conveyor from adjacent the same conveyor end. As will be brought out herein, this permits the maintenance on the conveyor of a compactly organized tier of articles.

Yet another object is the provision of article-handling apparatus wherein plural, laterally spaced holding conveyors are provided at one level in the apparatus, for storing articles in a tier. Means is provided for conveying articles to and away from the level of holding conveyors. The construction contemplated permits one of the holding conveyors at such level to be undergoing a loading process taking care of articles fed into the apparatus, while another conveyor is functioning to supply articles in the process of being withdrawn from the apparatus.

As a further feature of the invention, multiple, upright, gravity operated feed chutes are included which function to receive articles, after such are sorted, supplied from a supply conveyor. The feed chutes are constructed to discharge articles onto different transfer conveyors, which then carry the articles for assembly onto different ones of multiple holding conveyors.

To obtain compactness, in a preferred embodiment it is further contemplated that holding conveyors be stacked one over another so that article storage is in stacked tiers.

Yet another object of the invention is the provision, in article-handling apparatus, of a novel form of diverter which is actuatable to sort articles traveling into the apparatus on a supply conveyor whereby such are directed into different ones of multiple feed chutes.

A still further object of the invention is to provide a novel assembling means, utilized in the transfer of articles onto a holding conveyor.

Another object is to provide novel article-arresting means for controlling the discharge of articles from a chute, which is reliable and practical. The arresting means contemplated is particularly suited for the control of the discharge of paper rolls, since such can be operated with minimal chance of damage to the rolls.

DESCRIPTION OF THE DRAWINGS

These and other objects and advantages are attained by the invention which is described hereinbelow in conjunction with the accompanying drawings, wherein:

FIG. 1 is a top plan view, greatly simplified, illustrating article-handling apparatus as contemplated and showing portions of elongated holding conveyors used for the storage of rolls in the apparatus;

FIG. 5 is a view, on an even larger scale, taken along the line 5—5 in FIG. 1, illustrating a diverter which forms part of a classifier station in the apparatus;

FIG. 7 (page one of the drawings) illustrates, in simplified form and on a somewhat larger scale than FIG. 1, a motor drive unit provided for moving a holding conveyor under power;

FIG. 13 (page one of the drawings) is a schematic diagram showing portions of a control system that controls operation of the arresting mechanism illustrated in FIGS. 11 and 12.

Figures 2, 4:
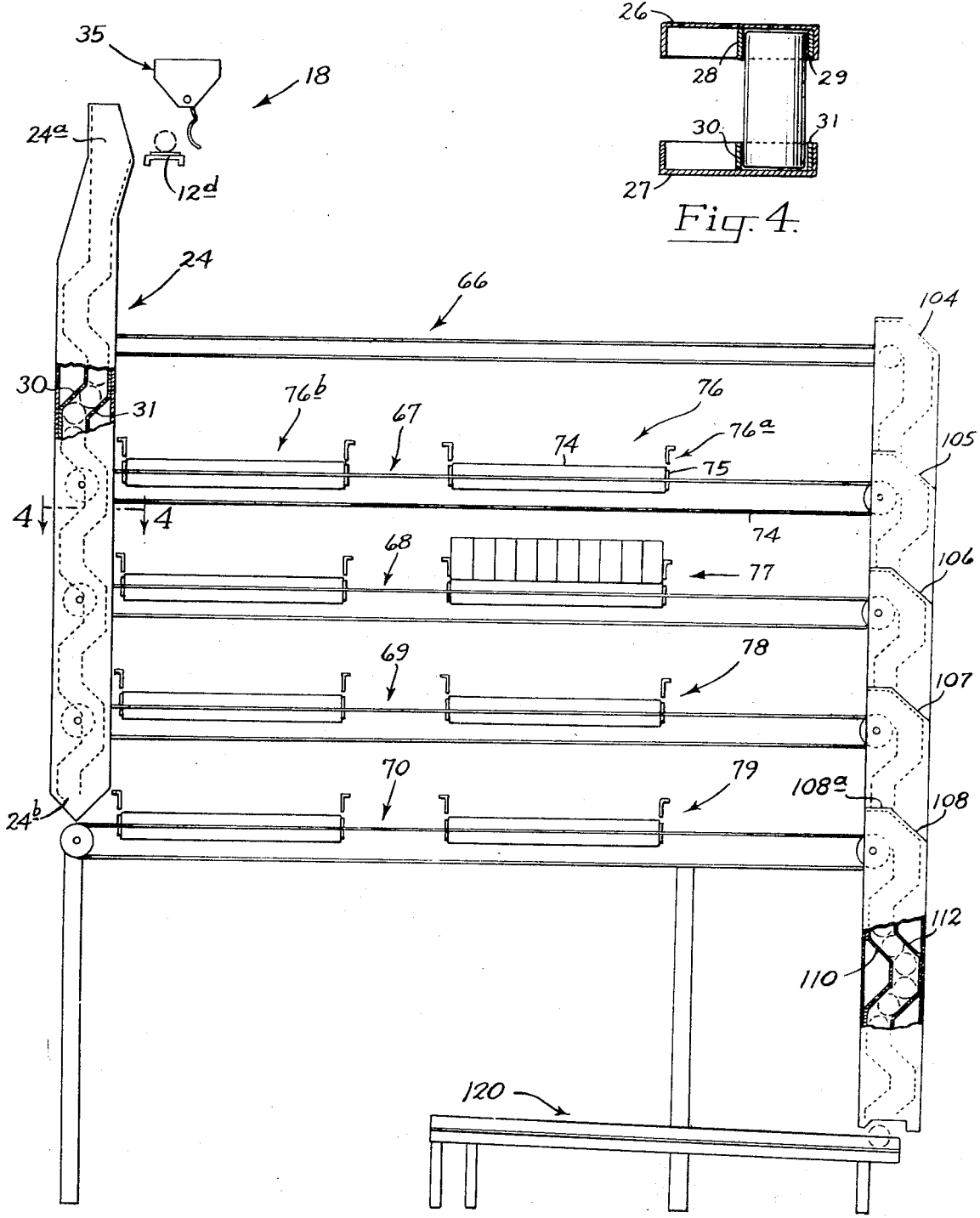
FIG. 2 is a view, somewhat enlarged and also greatly simplified, taken generally along the line 2—2 in FIG. 1, showing the ends of different levels of holding conveyors in the apparatus, and chutes used by rolls in traveling to and from such holding conveyors.
FIG. 4 (page two of the drawings) is a cross-sectional view taken generally along the line 4—4 in FIG. 2, drawn on a somewhat larger scale than FIG. 2.

The article-handling apparatus shown in the drawings is designed for the sorting and classified storage of different types of paper towel rolls, and for the repeated production from these rolls of a predetermined assortment of rolls containing different types of rolls. To facilitate the description of the apparatus, it will be assumed that the towel rolls of an assortment differ from each other in color, i.e., color is the basis of classification, although obviously some other characteristic could form the basis of classification.

GENERAL DESCRIPTION OF THE APPARATUS

Describing the apparatus in general terms, and referring to FIG. 1, towel rolls enter the apparatus while transported on what is referred to herein as a feed conveyor 12. In a paper plant, the towel rolls come from another region of the plant, and ordinarily a considerable number of rolls of one color will be transported into the apparatus before changing to another color. The roll color introduced to the apparatus is changed periodically, for the purpose of collecting within the apparatus the different colors of rolls desired in the assortments being prepared.

Feed conveyor 12 terminates at a classifier station shown at 18, which includes mechanism for directing rolls into the feed ends of one of multiple feed chutes, shown at 20, 21, 22, 23, and 24. The rolls may be sorted at the classifier station, with rolls of different color traveling down different ones of the chutes. The chutes are upright and gravity operated, and deposit rolls on transfer conveyors, shown at 66, 67, 68, 69 and 70, one of such conveyors being provided at the discharge opening of each chute.

Figure 3:
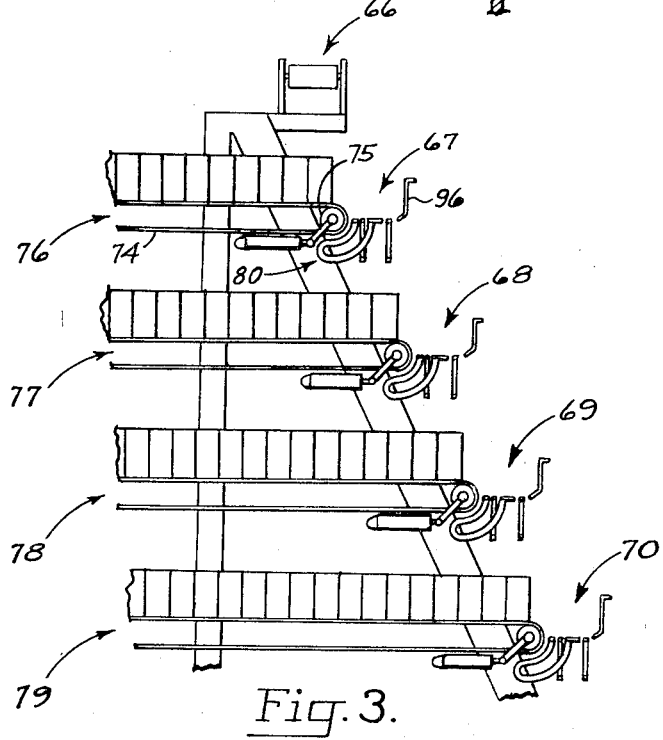
FIG. 3 is a view, also simplified, taken generally along the line 3—3 in FIG. 1, further illustrating the various levels of holding conveyors, and assembling means provided in the construction for assembling rolls on such conveyors.

Referring now also to FIGS. 2 and 3, the apparatus illustrated includes four levels of holding conveyors, shown at 76, 77, 78, and 79. Each level of holding conveyors constitutes what is referred to herein as a storage facility in the apparatus. Each level, in the embodiment of the invention illustrated, includes two holding conveyors, such as those shown at 76a and 76b for level 76 in FIG. 1. Each of the transfer conveyors 67, 68, 69, 70 is disposed adjacent one end of a level of holding conveyors. Transfer conveyor 66, on the other hand, has no associated level of holding conveyors, by reason of its being a bypass conveyor in the apparatus, provided for moving rolls not subject to temporary storage. For storage purposes, towel rolls are transferred from one of the transfer conveyors 67, 68, 69, 70 onto one of the levels of holding conveyors 76, 77, 78, 79.

Referring again to FIG. 1, the transfer conveyors have off-bearing extremities arranged to deposit rolls in the feed ends of delivery chutes, shown at 104, 105, 106, 107, and 108. These are also upright, gravity operated chutes, resembling feed chutes 20, 21, 22, 23, 24. The delivery chutes are constructed with discharge openings arranged to deposit rolls on a receiving conveyor 120. The particular chute from which rolls are discharged onto the receiving conveyor, and the number of rolls discharged, is controlled, whereby batches of rolls are formed on the conveyor as such are carried away by the conveyor with the rolls in such batches comprising a predetermined assortment of differently colored rolls. The receiving conveyor may carry the rolls to a facility such as a case packer, shown generally in dot-dash outline at 122, where the rolls are packed in cases or cartons.

Grating, such as that illustrated at 124 provides platform areas where an attendant may stand during supervision and maintenance of the apparatus. It should be understood that suitable framework is provided for supporting this grating, and other components of the apparatus, much of which has been deleted from the drawings to simplify the drawings, and to obtain greater clarity in explaining the principles of operation of the apparatus.

DETAILED DESCRIPTION OF THE INVENTION

Feed conveyor 12, which has its infeed end illustrated at 12a in FIG. 1, inclines upwardly progressing away from its infeed end in an expanse shown at 12b, and thence crosses over the top of the levels of holding conveyors, in an expanse 12c. The conveyor terminates in an expanse 12d which feeds paper towel rolls transported thereby into classifier station 18. The conveyor may take any of various known forms of construction. In the embodiment of the invention shown, expanses 12b, 12c, and 12d comprise belt conveyor sections, and roll conveyor sections, such as that shown at 12e, join adjacent extremities of the belt conveyor sections where there is a change in the direction of the path of travel.

The feed conveyor is power driven to effect movement of paper towel rolls in the direction of the arrow shown in FIG. 1. The rolls while transported by the feed conveyor are disposed on their sides with one following another, and are moved in an axial direction, which is to say the rolls travel endwise on the conveyor. The rolls are maintained properly oriented on the conveyor by fence structure, such as that shown at 15.

As earlier described, at classifier station 18 towel rolls carried on feed conveyor 12 are diverted into one of multiple feed chutes 20, 21, 22, 23, 24. As is best illustrated in FIG. 2, which shows in simplified form feed chute 24, each has an upper feed end, exemplified by feed end 24a, which is to one side of expanse 12d of the feed conveyor, and which is open where it faces this expanse of the feed conveyor. Referring now also to FIG. 4, extending down along the length of the chute, and housed within side channel members 26, 27, of the chute, are opposed sets of elongated rails, exemplified by set of rails 28, 29 and set of rails 30, 31. Each set of rails guides the end of a roll during its passage down the chute. The rails extend in a serpentine course, as best illustrated in FIG. 2, and in this way the rails partially support the weight of the stack of rolls which collects in the chute. Rolls collect in a chute lying on their sides, and stacked one over another.

Figure 6:
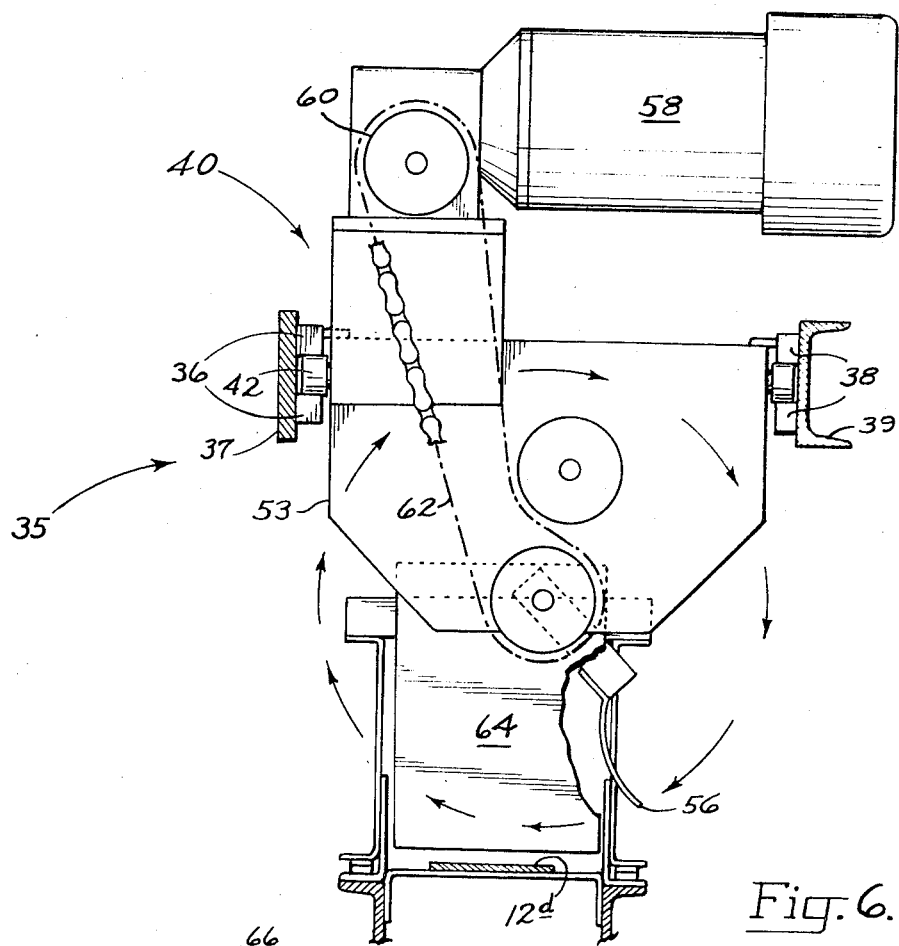
FIG. 6 (page three of the drawings) is a view taken generally along the line 6—6 in FIG. 5.

To effect sorting or classifying of rolls in the classifier station, the apparatus includes in the station a diverter 35, shown in rather simplified form in FIG. 2, but in more detail in FIGS. 5 and 6.

Referring now to these FIGS., suitably secured to portions 37, 39 of the frame of the apparatus, in laterally spaced relation and above the level of expanse 12d of the feed conveyor, are a pair of bars 36 and a pair of bars 38. The bars generally parallel expanse 12d of the feed conveyor. A traveling carriage 40 is supported on the bars through rollers 42 for movement along the length of the bars.

The carriage is moved under power, through operation of a motor drive unit partially shown at 44. The motor drive unit is mounted in a stationary position on the frame of the apparatus, adjacent one set of ends of the bars. Connected to the drive unit to be driven thereby is a sprocket 46. The sprocket trains a chain 48 which has its opposite extremity traveling over an idler sprocket 50. The chain is anchored, as at 47, to the carriage.

Dependently supported under the carriage, and journaled on carriage bracket structure 52, 53, is a shaft 54 mounting a motor-driven kicker blade or means 56, having an end mounting a sprocket 57. Supported on top of the carriage is a motor drive unit 58 which powers a sprocket 60. A chain 62 is trained over sprockets 57 and 60. With the construction described, and on actuation of the motor drive unit, the kicker blade is made to revolve in a clockwise direction in FIG. 6, with movement in successive passes or sweeps over the top of and across feed conveyor expanse 12d. This movement is effective to eject paper towel rolls carried on the feed conveyor into a chute, with the carriage positioned so that the kicker blade registers with the open end of the chute when passing over conveyor expanse 12d.

With conveyor 12d operating, its upper run moves in the direction of the arrow in FIG. 5. Forward progress of a roll beyond the kicker blade is stopped by depending stop plate or stop 64, the kicker blade being upstream on the conveyor from the stop.

Fence or guide structure is shown at 55 which is joined to bracket structure 52 of the carriage whereby it moves with the carriage. The fence structure confines the sides of rolls as they move on conveyor expanse 12d to the region of the kicker blade.

During operation of the classifier station, the carriage is moved intermittently, to place the kicker blade in proper registering position with the open feed end of respective chutes as the need arises. Not shown, but contemplated, is an electrical control system which determines when a chute in the process of being loaded is completely filled, and which then functions to deactuate the motor drive unit 58 to prevent further movement of the kicker blade. Also contemplated, but not shown, is an electric control system determining the actuation of motor drive unit 44, affording remote control of carriage movement, and operable on it being determined that a particular feed chute is to be supplied with towel rolls to stop the carriage with the kicker blade in proper registering position with such chute.

Transfer conveyors 66, 67, 68, 69, 70 have been described, which are disposed at different elevations in the apparatus, as best illustrated in FIG. 2. In the particular embodiment of the invention described, conveyor 66 is the uppermost conveyor, and conveyors 67, 68, 69, and 70 are disposed at successively lower elevations. The discharge opening of feed chute 24, shown at 24b, is over transfer conveyor 70, or the lowermost of the various transfer conveyors, and thus this feed chute is operable to deposit rolls on transfer conveyor 70. Feed chute 23 is constructed with its discharge opening overlying transfer conveyor 69 for effecting deposit of rolls on this conveyor. Similarly, chute 22 discharges on conveyor 68, chute 21 discharges on conveyor 67, and chute 20 discharges on conveyor 66. The various transfer conveyors are moved under power, by operation of conventional power-operated drive means for the conveyors, not shown.

Considering now the construction of the holding conveyors, each of the holding conveyors, which provides for temporary storage of rolls during their passage through the machine, may comprise an elongated, endless conveyor belt, such as belt 74 shown in FIGS. 1, 2, and 3 for holding conveyor 76a. The belt at opposite extremities is trained over rolls, exemplified by roll 75 shown for holding conveyor 76a. To provide adequate storage capacity, the belts have considerable length, and suitably supporting the runs of the belt between opposite extremities are roller guides or other means (not shown). The upper run of the belt in a holding conveyor defines a horizontal supporting surface for such holding conveyor.

Each level of holding conveyors comprises two holding conveyors, which function to provide storage for towel rolls transported by the transversely extending transfer conveyor which is adjacent a set of ends of the holding conveyors. It should be noted that the rolls that support the holding conveyors at this set of ends of the holding conveyors are mounted with their axes substantially at the level of the top of the adjacent transfer conveyor, as best shown in FIGS. 2 and 3. By reason of this, the supporting surfaces of the holding conveyors are somewhat elevated above the top of the transfer conveyor.

The upper run of each holding conveyor is moved under power by operation of a motor drive unit such as the one shown at 81 in FIGS. 1 and 7. Such includes a motor and conventional clutch mechanism operatively connected to rolls over which the lower run of the holding conveyor travels. The drive unit is reversible, to permit powered movement of the upper conveyor run either toward or away from the associated transfer conveyor. The drive unit may also be operated to produce intermittent movement of the conveyor in steps.

Figure 8:
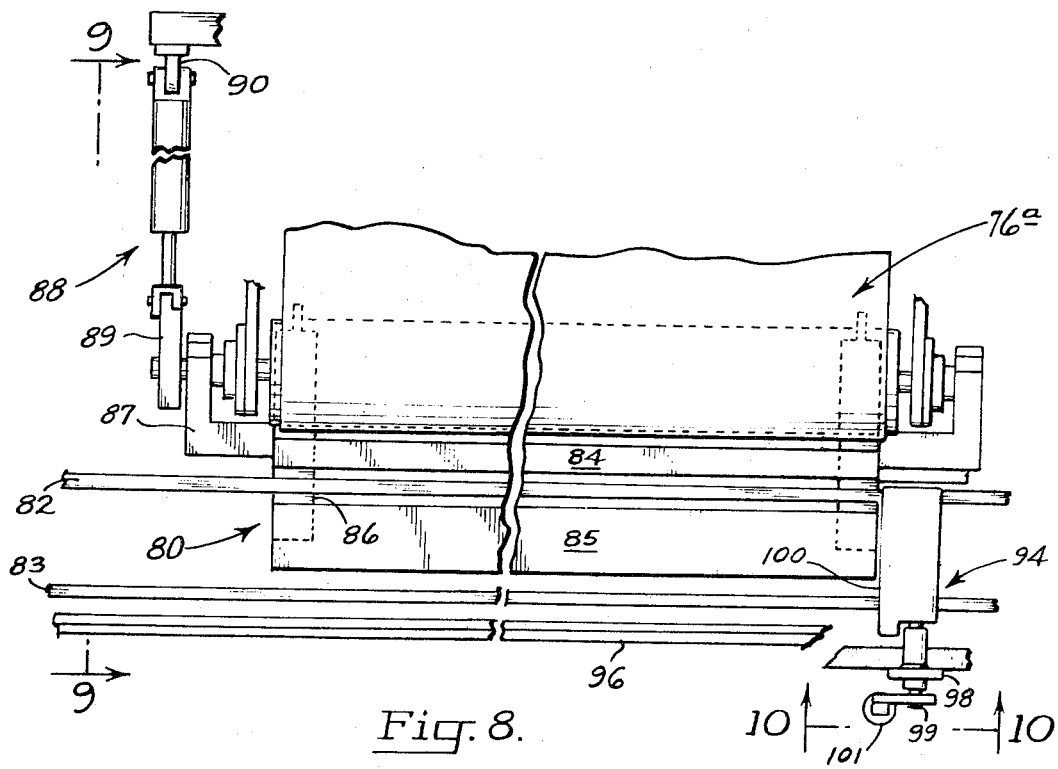
FIG. 8 is a plan view, on a larger scale than in FIG. 1, showing end portions of a holding conveyor and article-assembling means provided for transferring articles onto the holding conveyor.
Figure 9:
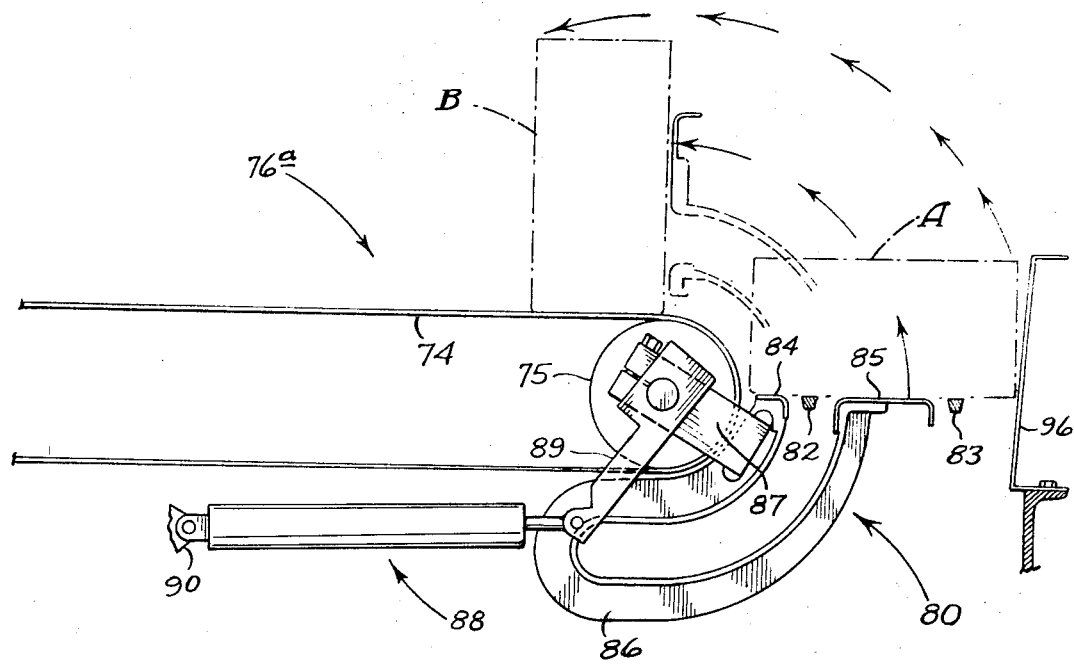
FIG. 9 is a cross-sectional view, taken generally along the line 9—9 in FIG. 8, and on a larger scale than FIG. 8.

As best illustrated in FIGS. 3, 8, and 9, associated with each holding conveyor is what is referred to herein as an assembling means or mechanism, such as the one generally depicted at 80. Such is actuatable to lift a row of towel rolls on a transfer conveyor and deposit the rolls on the holding conveyor.

Considering further details of an assembling means, while not shown in FIG. 1 because of space limitations, but more clearly illustrated in FIGS. 8 and 9, each of the transfer conveyors which extends adjacent holding conveyors comprises a pair of laterally spaced belts, such as those shown at 82, 83. Rolls deposited on a transfer conveyor by a feed chute lie on their sides, and are oriented with their axes extending transversely of the belts. The assembling means includes a pair of elongated support bars 84, 85 interspersed with these belts.

The support bars at each of their adjacent set of ends are joined by a U-shaped bracket 86. The brackets at opposite sets of ends of the support bars are journaled for swinging movement about an axis corresponding to the axis of the roll supporting the end of the holding conveyor, through structure including mountings 87. The support bars and U-shaped brackets together make up what is referred to as a tiltup section. The tiltup section is swingable upwardly from the lowered position shown in FIG. 9, where the support bars are slightly below the level of the belts in the transfer conveyor, to an upright position, where the bars are in a substantially vertical plane and located above the roll supporting the end of the holding conveyor. This latter position is illustrated in FIG. 9 in dashed outline.

Powered means is provided for producing such movement of the tiltup section. Thus, as can be seen in FIGS. 8 and 9, associated with each tiltup section is a fluid-operated ram, such as the one shown in 88. The rod end of this ram is connected by a lever 89 to the tiltup section, and the cylinder end is suitably anchored, as at 90, to the frame of the apparatus.

Figure 10:
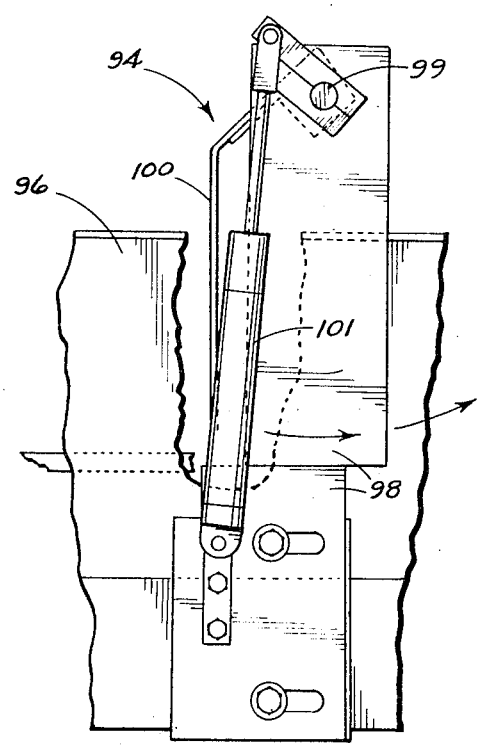
FIG. 10 is a view, on approximately the scale of FIG. 9, taken along the line 10—10 in FIG. 8.

To stop a series of rolls supported on the transfer conveyor in front of a holding conveyor with such in proper position for transfer to the holding conveyor, a gate mechanism 94 is provided, of the type illustrated in FIGS. 8 and 10. Further explaining the gate mechanism, a fence 96 is shown, positioned along one side of the transfer conveyor, for guiding one set of ends of rolls carried by the transfer conveyor. Post structure 98 secured to the frame of the apparatus projects upwardly above the top of such fence, and adjacent its top journals a shaft 99 which extends across the transfer conveyor at a point elevated above the conveyor. Gate 100 joined to the shaft depends downwardly from the shaft when positioned to stop the forward progress of rolls. A fluid-operated ram 101 connected to shaft 99 is contracted to swing the gate in a counterclockwise direction in FIG. 10 to place the gate in a generally horizontal position which provides clearance for rolls to pass thereunder.

In the loading of a holding conveyor with the assembling means including gate mechanism just described, gate 100 is lowered to stop the forward progress of rolls beyond the gate. The tiltup section is maintained in its lowered position during this time. After a row of rolls has accumulated behind the gate which covers the tiltup section (such rolls being positioned as shown at A in FIG. 9), the tiltup section may be swung upwardly, to place these rolls on end on the associated holding conveyor (the rolls then having the position shown at B in FIG. 9). The rolls then form a row on the holding conveyor. To accommodate another row of rolls, the holding conveyor is moved so that its upper run moves away or recedes from the transfer conveyor a sufficient distance to accommodate the snug placement of another row adjacent the just-deposited row. In this way a closely packed tier of rolls may be prepared. To unload rolls from the holding conveyor, the conveyor is run in the opposite direction, with rows of rolls then falling off the holding conveyor onto the transfer conveyor.

The construction of the delivery chutes may be similar to the construction of the feed chutes already described. Thus, as can be seen in FIG. 2, each includes sets of rails, such as those shown at 110, 112, for guiding ends of rolls down the chute, with such rolls moving in a serpentine course. Each has an upper, feed end, as represented by end 108a of delivery chute 108, positioned to receive rolls conveyed thereinto by a transfer conveyor. The rolls move into and collect within a chute while lying on their sides, i.e., with the orientation that they have on the transfer conveyor.

The various delivery chutes have discharge openings which are directly above receiving conveyor 120. The discharge openings of the various chutes are spaced along the length of the receiving conveyor. The rolls that are transported away from the delivery chutes on the receiving conveyor have an assortment of colors which is dependent upon which of the delivery chutes is opened up to drop rolls onto the conveyor, how long such chutes are opened up, and the sequence in which the chutes are opened up.

Figure 11:
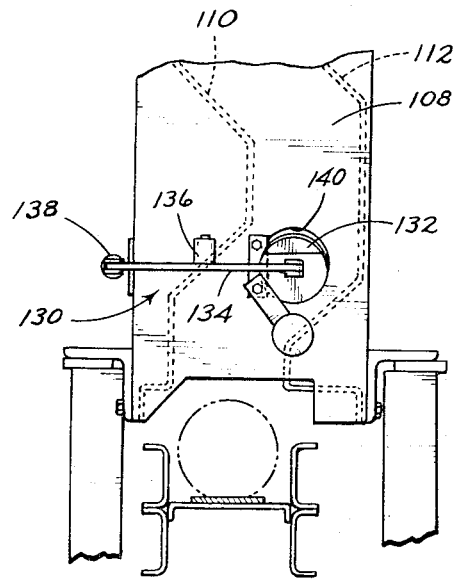
FIG. 11 is an enlarged view showing the bottom end of a chute in the apparatus, and arresting mechanism provided for controlling the flow of rolls through the chute.
Figure 12:
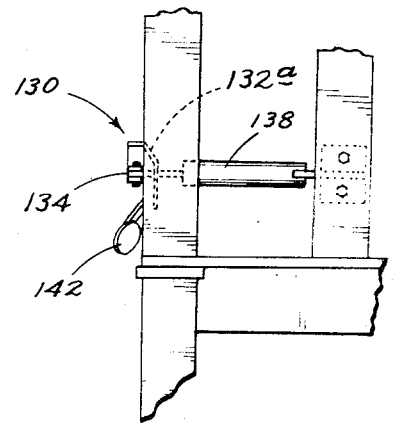
FIG. 12 is a view showing the side of the chute as viewed in FIG. 11.

To control the flow of rolls from out of a chute, arresting mechanism may be provided at the base of the chute, of the type illustrated in FIGS. 11 and 12 at 130. One of such mechanisms may be provided at the bottom end of each of the feed and delivery chutes, but such have not been shown in the other drawings in order to simplify the drawings. Referring to FIGS. 11, and 12, the arresting mechanism shown comprises a generally circular pad or clamp 132 mounted on the end of a rock arm 134 rockably supported by a mounting 136 for rocking movement about an upright axis. The end of the rock arm remote from pad 132 is connected to the rod end of a hydraulic ram or power-operated means shown at 138. The side of the chute is cut out, as with circular aperture 140, to receive the pad. As best seen in FIG. 12, top margin 132a of the pad inclines outwardly slightly, away from the path of travel for rolls down the chute.

Ram 138 may be actuated to move the pad between a position where the bottom of the chute is opened up for roll movement, where the distance between the bottom of the pad and the opposite side of the chute slightly exceeds the length of a roll, and a roll clamping position where roll movement through the bottom of the chute is arrested or checked. The pad in such roll clamping position is shifted toward the side of the chute opposite the pad, by extension of ram 138, with any roll opposite the pad then being clamped at opposite ends between the pad and opposing chute wall. With a full stack of rolls in the chute, and a roll held in place by the pad at the base of the chute, the stack of rolls is prevented from falling down the chute.

The inclined marginal portion at the top of the pad performs a guiding function, in directing roll ends so that they pass about the pad without tending to catch on the pad.

Illustrated in FIGS. 11 and 12 is a mirror 142. This mirror is used to direct a beam of light emitted from a light source onto a photocell device. In FIG. 13, the light source and photocell device are indicated schematically at 144 and 146, respectively. The parts are arranged in such a manner that a roll on passing downwardly below the location of pad 132 will break the beam of light being transmitted to the photocell device. This actuates the photocell device whereby it, in turn, actuates a counter, shown at 148, which counts the number of rolls dropping from out the bottom end of the chute.

The counter, through control circuitry illustrated schematically at 150, controls the actuation of solenoid operated valve 152 which controls the supply and exhaust of pressure fluid to ram 138.

In connection with the delivery chutes, as contemplated by this invention, the control circuitry mentioned may be programmed, whereby for a given delivery chute a certain number of rolls are permitted to drop from the base of the chute with further discharge then stopped by actuation of the chute's arresting mechanism. A predetermined number of rolls is then permitted to drop from one or more of the other delivery chutes before the first-described chute is opened up again for roll discharge. The particular chute which discharges rolls, and the number of rolls discharged from a chute during a discharging period, may be varied by different programming of the control circuitry.

In connection with feed chutes 20, 21, 22, 23, and 24, again the rolls are counted on leaving the chutes and roll discharge controlled using for each chute, an arresting mechanism as described. The number of rolls discharged from the bottom of a given chute at any given time may be selected to be the number of rolls required to make a complete row on a holding conveyor. Assuming for instance, that a holding conveyor has a width whereby a row of 10 rolls is accommodated on the conveyor, then the discharge of rolls from a particular feed chute is set up to be in batches of 10. The apparatus is controlled so that during loading of a holding conveyor, a batch of rolls is discharged from the feed chute supplying the holding conveyor when the region in front of the holding conveyor is free of rolls and in condition to accept a batch for loading.

GENERAL OPERATION OF THE APPARATUS

The operation of the apparatus should be apparent from the foregoing description. Paper towel rolls are fed into the apparatus by depositing such on the feed conveyor, with such rolls then traveling up to classifier station 18. In packaging cartons containing, for example, 30 rolls of four different colors, the apparatus may be suitably filled with a large quantity of rolls of each color. In the classifier station, the rolls are sorted, with rolls of different colors being directed to different levels of holding conveyors in the apparatus.

During loading of a holding conveyor, multiple rolls sufficient to form a full row on the holding conveyor are permitted to be discharged from the feed chute which is supplying the rolls for the holding conveyor. Further roll flow is then stopped by actuation of the chute's arresting mechanism. The rolls are carried by the transfer conveyor where they collect in front of the holding conveyor by coming against the gate associated with the holding conveyor, which is then lowered. The tiltup section of the assembling means for the holding conveyor may then be actuated, to pick up the rolls and deposit such, on end, on the holding conveyor. This operation may then be repeated, with stepwise receding movement of the holding conveyor to accommodate the placement of each new row of rolls.

Assuming still the handling of four different colors of rolls using the procedure just outlined, each of the four levels 76, 77, 78, 79 of holding conveyors may be loaded with a supply of towel rolls, with a different color of roll on each level. Each of the delivery chutes 105, 106, 107, 108 may be filled with rolls of a different color through unloading of one of the holding conveyors in the level of holding conveyors that functions as a storage facility for the delivery chute. Thus, and for the purpose of filling delivery chute 108, one of the holding conveyors in level 79 may be operated so that its upper run is advanced in steps toward transfer conveyor 70. This causes rows of rolls carried by the holding conveyor periodically to be dumped onto the transfer conveyor. The rolls then are carried by its transfer conveyor to the feed end of delivery chute 108 whence they collect in the chute.

To produce repeatedly on delivery conveyor 120 batches of rolls containing a predetermined assortment of colors, the delivery chutes are opened up, selectively, whereby the desired number of rolls from each chute is periodically deposited on the delivery conveyor. Assuming still the packaging of 30 roll cartons, and that seven rolls of each of two colors, and eight of the remaining two colors, are to make up the assortment contained in one carton, seven rolls of one color are permitted to be discharged onto the delivery conveyor from the delivery chute handling the color. This is done with counting of the rolls as they fall from the conveyor, roll discharge stopping after seven rolls have been counted. With counting, seven rolls of another color handled in another delivery chute may then be deposited on the delivery conveyor. In a similar manner, eight rolls from each of the remaining delivery chutes are counted out and deposited on the delivery conveyor. The entire operation is then repeated to produce another batch of rolls having the same assortment of colors.

The entire operation may be carried out substantially automatically, with rolls advancing from one stage to the next in the apparatus as determined by the demand for rolls at the succeeding stage.

The apparatus is extremely flexible in operation. With the color assortment produced on the delivery conveyor being determined by controlling roll discharge on the basis of counting rolls discharging from respective delivery chutes, it is an easy matter to change the type of assortment produced by changing the number of rolls permitted to fall from the respective chutes during a discharging period.

It should also be noted that by providing two holding conveyors in a level of holding conveyors, loading of rolls onto one holding conveyor may take place simultaneously with unloading of rolls from the other, using the transfer conveyor common to both. This is important in obtaining continuity in operation. The provision of two holding conveyors has the further advantage of permitting the storage of different colors of rolls in one tier, which is to say that one holding conveyor may be employed to store one color and the other holding conveyor to store another color of roll. This circumstance occurs, for instance, when changing the roll color held in a tier.

By reason of the fact that the same end of a holding conveyor is used in the loading and unloading of rolls, it is possible to arrange the rolls while stored in compactly placed rows, without excessive gaps or spaces occurring between successive rows. The rolls are immediately available for discharge onto a transfer conveyor and feeding into the delivery chutes.

While a particular embodiment of the invention has been described, it should be obvious that variations and changes are possible without departing from the invention. It is desired to covered all such modifications and variations as would be apparent to one skilled in the art.

It is claimed and desired to secure by Letters Patent:

1. Article-assembling apparatus comprising multiple upright gravity operated delivery chutes, each adapted to store plural stacked articles with one above the other and each having a discharge opening adjacent the bottom of the chute where articles one after another may be ejected from the chute on dropping by gravity down the chute,
   a generally horizontal receiving conveyor common to all the chutes, said chutes being arranged with their discharge openings spaced at intervals along the length of the receiving conveyor and in a position to eject articles onto the receiving conveyor,
   remotely controlled arresting mechanism for each chute, said mechanism having one position where articles are permitted to move out of the chute's discharge opening and being actuatable to another position where such movement is arrested,
   a storage facility for each chute including a holding conveyor adapted to store row on row of articles with such forming a tier of articles, and
   transfer means for each chute for transferring articles stored on the chute's holding conveyor and supplying such articles to the top of the chute with such oriented for stacking in the chute.

2. The apparatus of claim 1, wherein the articles are substantially cylindrical in shape and are supported on end in such tier, and said transfer means includes a transfer conveyor adjacent one end and extending transversely of the holding conveyor adapted to conveyor articles with such on their sides to the top of the chute, and which further comprises assembling means for taking the articles on their sides on said transfer conveyor and assembling them on end on said holding conveyor.

3. Article-assembling apparatus comprising multiple upright gravity operated delivery chutes, each adapted to store plural stacked articles with one above the other and each having a discharge opening adjacent the bottom of the chute where articles may be ejected from the chute on dropping down the chute,
   a generally horizontal receiving conveyor common to all the chutes, said chutes being arranged with their discharge openings spaced at intervals along the length of the receiving conveyor and in a position to eject articles on the receiving conveyor,
   remotely controlled arresting mechanism for each chute for controlling the ejection of articles from the chute,
   a storage facility for each of said chutes including a holding conveyor adapted to hold row on row of articles with such extending as a horizontal tier,
   a transfer conveyor for each chute extending transversely of the chute's holding conveyor adjacent one of the latter's ends, said transfer conveyor having a discharge end positioned to convey articles into the top of the chute,
   articles assembling means for each transfer conveyor which may be actuated to take articles from the transfer conveyor and place them on the holding conveyor, and
   feed means for feeding articles onto each transfer conveyor.

4. The apparatus of claim 3, wherein the articles are cylindrical rolls and are supported on end in said tier, and wherein said assembling means is constructed to remove articles with such on their sides on the transfer conveyor and place them on end on the holding conveyor.

5. Article-handling apparatus comprising an elongated holding conveyor including a conveyor belt having an upper run defining a substantially horizontal supporting surface,
   a transfer conveyor extending transversely of the holding conveyor at one end of the latter,
   article-assembling means having a loading cycle where it takes multiple articles resting on the transfer conveyor and places them on the upper run of the holding conveyor,
   motor drive means for the holding conveyor actuatable to move the upper run of said belt of the holding conveyor away from the transfer conveyor after said assembling means has undergone a loading cycle, to prepare the holding conveyor for the reception of additional articles, said motor drive means also being actuatable to move the upper run of the belt of the holding conveyor toward the transfer conveyor for the purpose of depositing articles held on the holding conveyor onto the transfer conveyor,
   said transfer conveyor having an off-bearing end disposed to one side of the holding conveyor, and
   an upright gravity operated chute for holding articles with such stacked one above the other, said chute having an upper feed end positioned adjacent the offbearing end of the transfer conveyor for receiving articles conveyed thereto by the transfer conveyor.

6. Article-sorting apparatus comprising a first and a second holding conveyor for the storing of articles, an upright gravity operated feed chute for each holding conveyor adapted to hold plural stacked articles with one above the other and each having an upper feed end and a discharge opening adjacent its base where articles may be ejected from the chute, an upright gravity operated delivery chute for each holding conveyor adapted to hold plural stacked articles with one above the other and each having an upper feed end and a discharge opening adjacent its base where articles may be ejected from the chute, transfer means for each holding conveyor for transferring articles from the discharge opening of the feed chute associated with the holding conveyor to adjacent the holding conveyor and for transferring articles from adjacent the holding conveyor to the feed end of the delivery chute associated with the holding conveyor, article assembling means for each holding conveyor for removing articles from the transfer means associated with the holding conveyor and loading them on the holding conveyor to effect storage of the articles, a supply conveyor for transporting articles into the apparatus, and adjustable diverter mechanism for directing articles carried on said supply conveyor into the feed end of a selected one of said feed chutes.

7. The article-sorting apparatus of claim 6, wherein the holding conveyors are disposed one above the other thus to store articles carried thereon in stacked tiers.

8. The apparatus of claim 6, wherein the transfer means for each holding conveyor comprises an elongated transfer conveyor extending from the discharge opening of the feed chute associated with the conveyor to the feed end of the delivery chute associated with the conveyor, each holding conveyor comprises an elongated belt with an upper run providing a substantially horizontal supporting surface, the transfer conveyor extends transversely of its associated holding conveyor at one end of the latter, and power drive means is provided for moving the belt of each holding conveyor actuatable to move the upper run of the belt in the holding conveyor away from the associated transfer conveyor during loading of articles on the holding conveyor and actuatable to move the upper run of the holding conveyor toward the transfer conveyor during unloading of articles from the holding conveyor.

9. Roll-sorting apparatus comprising
a delivery conveyor for transporting rolls endwise into the apparatus,
fence structure adjacent opposite sides of the delivery conveyor maintaining rolls oriented endwise thereon,
plural gravity operated chutes each having an upper feed end and a discharge opening adjacent its base,
said feed ends of said chutes being disposed in a row alongside an expanse of said delivery conveyor with one following another along said expanse, and
diverter mechanism mounted for adjustable movement along a path which is adjacent and substantially parallels said expanse of the delivery conveyor,
said diverter mechanism including a stop movable with the diverter mechanism for stopping forward progress of rolls on the delivery conveyor, and motor-driven kicker means movable in a sweep across the delivery conveyor adjacent said stop and upstream on the delivery conveyor from said stop, said kicker means operating to move rolls off the delivery conveyor and direct the rolls into the feed end of a chute.

10. Article-handling apparatus comprising an elongated holding conveyor including a conveyor belt having an upper run defining a substantially horizontal supporting surface, said holding conveyor further including a roll at one end and said belt being trained over said roll,
a transfer conveyor extending transversely of the holding conveyor at said one end of the holding conveyor, said transfer conveyor comprising a belt having an upper run substantially paralleling the axis of said roll and disposed below the level of the upper run of said belt in said holding conveyor,
article-assembling means having a loading cycle operable to take multiple articles resting on the transfer conveyor and place them on the upper run of the belt of said holding conveyor, said article-assembling means comprising an elongated support which substantially parallels said upper belt run of the transfer conveyor, said support having a lowered position where the support is spaced alongside of but below the upper run of the belt of the transfer conveyor and being mounted for movement in an arcuate sweep about an axis substantially corresponding to the axis of said roll for movement to a raised position where it is located above the upper run of the belt of the holding conveyor, and
motor drive means for the holding conveyor actuatable to move the upper run of said holding conveyor belt away from the transfer conveyor after said assembling means has undergone a loading cycle, to prepare the holding conveyor for the reception of additional articles, said motor drive means also being actuatable to move the upper run of the holding conveyor toward the transfer conveyor for the purpose of depositing articles held on the holding conveyor onto the transfer conveyor.

11. Article-handling apparatus comprising a pair of elongated holding conveyors, each including a conveyor belt having an upper run defining a substantially horizontal supporting surface, said upper runs of said belts being disposed laterally of each other, said holding conveyors having a sets of ends which are substantially in transverse alignment,
a transfer conveyor extending transversely of the pair of holding conveyors at said one set of ends,
article-assembling means for each holding conveyor having a loading cycle operable to take multiple articles resting on the transfer conveyor and place them on the upper run of the belt in the holding conveyor,
a gate for each holding conveyor disposed above said transfer conveyor, having one position where the forward progress of articles on the transfer conveyor is stopped and articles collecting on the transfer conveyor are readied for transfer to the holding conveyor, and another position where articles on said transfer conveyor move freely past said gate, and
motor drive means for each holding conveyor actuatable to move the upper run of the holding conveyor away from the transfer conveyor after said assembling means has undergone a loading cycle to prepare the holding conveyor for the reception of additional articles, said motor drive means also being actuatable to move the upper run of the holding conveyor toward the transfer conveyor for the purpose of depositing articles held on the holding conveyor onto the transfer conveyor.

12. Article-handling apparatus comprising an elongated holding conveyor including a conveyor belt having an upper run defining a substantially horizontal supporting surface,
a transfer conveyor extending transversely of the holding conveyor at one end of the latter,
article-assembling means having a loading cycle where it takes multiple articles resting on the transfer conveyor and places them on the upper run of the holding conveyor,
motor drive means for the holding conveyor actuatable to move the upper run of said holding conveyor belt away from the transfer conveyor after said assembling means has undergone a loading cycle, to prepare the holding conveyor for the reception of additional articles, said motor drive means also being actuatable to move the upper run of the holding conveyor belt toward the transfer conveyor for the purpose of depositing articles held on the holding conveyor onto the transfer conveyor,
said transfer conveyor having a feed end on one side and an off-bearing end on the other side of said holding conveyor,
an upright gravity operated feed chute disposed above said feed end of the transfer conveyor adapted to hold plural stacked articles with one above the other, said feed chute having a discharge opening positioned to eject articles onto the feed end of the transfer conveyor, and
an upright gravity operated delivery chute disposed below the off-bearing end of the transfer conveyor, said delivery chute having a feed end positioned to receive articles carried to the off-bearing end of the transfer conveyor.

* * * * *